US005247618A

United States Patent [19]

Davis et al.

[11] Patent Number: 5,247,618

[45] Date of Patent: Sep. 21, 1993

[54] TRANSFERRING DATA IN A DIGITAL DATA PROCESSING SYSTEM

[75] Inventors: Scott H. Davis, Merrimack; William L. Goleman, Nashua; David W. Thiel, Amherst, all of N.H.; Robert G. Bean; James A. Zahrobsky, both of Colorado Springs, Colo.

[73] Assignee: Digital Equipment Corporation, Maynard, Mass.

[21] Appl. No.: 882,765

[22] Filed: May 11, 1992

Related U.S. Application Data

[63] Continuation of Ser. No. 374,253, Jun. 30, 1989, abandoned.

[51] Int. Cl.[5] .......... G06F 13/14

[52] U.S. Cl. .......... 395/275; 395/425; 395/325; 371/10.1; 364/228.1; 364/243; 364/243.1; 364/256.3; 364/256.6; 364/DIG. 1; 364/931.46; 364/DIG. 2

[58] Field of Search .......... 395/275, 425, 325, 250, 395/200; 371/12, 10.1, 10.2, 21.1; 364/134, 228.1, 243, 243.1, 256.3, 256.6, DIG. 1, 931.46, DIG. 2

[56] References Cited

U.S. PATENT DOCUMENTS

| | | | |
|---|---|---|---|
| 3,544,777 | 12/1970 | Winkler | 371/10.1 |
| 3,668,644 | 6/1972 | Looschen | 345/575 |
| 4,199,810 | 4/1980 | Gunckil | 395/425 |
| 4,432,057 | 2/1984 | Daniell et al. | 364/300 |
| 4,467,421 | 8/1984 | White | 395/425 |
| 4,476,526 | 10/1984 | Dodd | 395/425 |
| 4,503,534 | 3/1985 | Budde et al. | 371/9 |
| 4,584,681 | 4/1986 | Singh et al. | 371/10 |
| 4,600,990 | 7/1986 | Gershenson et al. | 364/200 |
| 4,602,368 | 7/1986 | Circello et al. | 371/21 |
| 4,603,406 | 7/1986 | Miyazaki et al. | 371/10.1 |
| 4,608,687 | 8/1986 | Dutton | 371/10.2 |
| 4,608,688 | 8/1986 | Hansen | 371/11.3 |
| 4,616,312 | 10/1986 | Uebel | 364/200 |
| 4,617,475 | 10/1986 | Reinschmidt | 307/441 |

(List continued on next page.)

FOREIGN PATENT DOCUMENTS

| | | |
|---|---|---|
| 0026980 | 4/1981 | European Pat. Off. . |
| 303856 | 2/1989 | European Pat. Off. . |
| 2188177 | 9/1987 | United Kingdom . |

OTHER PUBLICATIONS

Research Disclosures No. 296, Dec. 1988, New York, N.Y., US; RD 29647 (Anonymous): "Data Integrity During Mirror Synchronisation".

Search Report for European Patent Application 90306859.1.

Patent abstracts of Japan, JP-A-59201297, Nov. 14, 1984.

Haskin, "Virtual Disk Casts a Long Shadow" (Aug. 1988), pp. 49-52.

*Primary Examiner*—Michael R. Fleming
*Assistant Examiner*—Glenn A. Auve
*Attorney, Agent, or Firm*—Fish & Richardson

[57] ABSTRACT

A method and apparatus for transferring data between two storage media, and is used in an illustrative embodiment to transfer data between two storage media in a shadow set, the storage media being accessible to one or more host processors. The method of the preferred embodiment includes the steps of: A. receiving a command from one of the host processors, the command specifying data to be transferred from a first storage medium to a second storage medium; B. transferring the data specified in the command received from the host from the first storage medium to the second storage medium in a series of subtransfers, each of the subtransfers transferring a portion of the data; and C. processing one or more I/O requests to the shadow set received from one or more host processors by, for each received I/O request: a. implementing the I/O request if the I/O request does not involve a section of the shadow set currently involved in one of the subtransfers; and b. stalling the I/O request if the I/O request involves a section of said shadow set currently involved in one of the subtransfers, and implementing the I/O request when the subtransfer has completed.

40 Claims, 4 Drawing Sheets

HOST
PROCESSOR
MEMORY
INT
STORAGE SUBSYSTEM
DISK CONTROLLER
BUFFER
PROCESSOR
MEMORY

U.S. PATENT DOCUMENTS

| | | | |
|---|---|---|---|
| 4,636,946 | 1/1987 | Hartung et al. | 364/200 |
| 4,638,424 | 1/1987 | Beglin et al. | 364/200 |
| 4,654,819 | 3/1987 | Stiffler et al. | 364/900 |
| 4,686,620 | 9/1987 | Ng | 364/200 |
| 4,688,219 | 8/1987 | Takemae | 371/10 |
| 4,710,870 | 12/1987 | Blackwell et al. | 364/200 |
| 4,747,038 | 5/1988 | Bradley et al. | 364/200 |
| 4,750,106 | 6/1988 | Aiken et al. | 364/200 |
| 4,751,639 | 6/1988 | Corcoran | 395/575 |
| 4,755,928 | 7/1988 | Johnson | 395/575 |
| 4,768,193 | 8/1988 | Takemae | 371/10 |
| 4,771,375 | 9/1988 | Beglin et al. | 364/200 |
| 4,805,095 | 2/1989 | Armstrong | 395/775 |
| 4,814,971 | 3/1989 | Thatte | 395/575 |
| 4,819,154 | 4/1989 | Stiffler et al. | 364/200 |
| 4,916,605 | 4/1990 | Beardsly | 395/425 |
| 4,959,774 | 9/1990 | Davis | 364/200 |
| 5,060,185 | 10/1991 | Naito et al. | 371/10.1 |
| 5,089,958 | 2/1992 | Horton et al. | 371/10.1 |

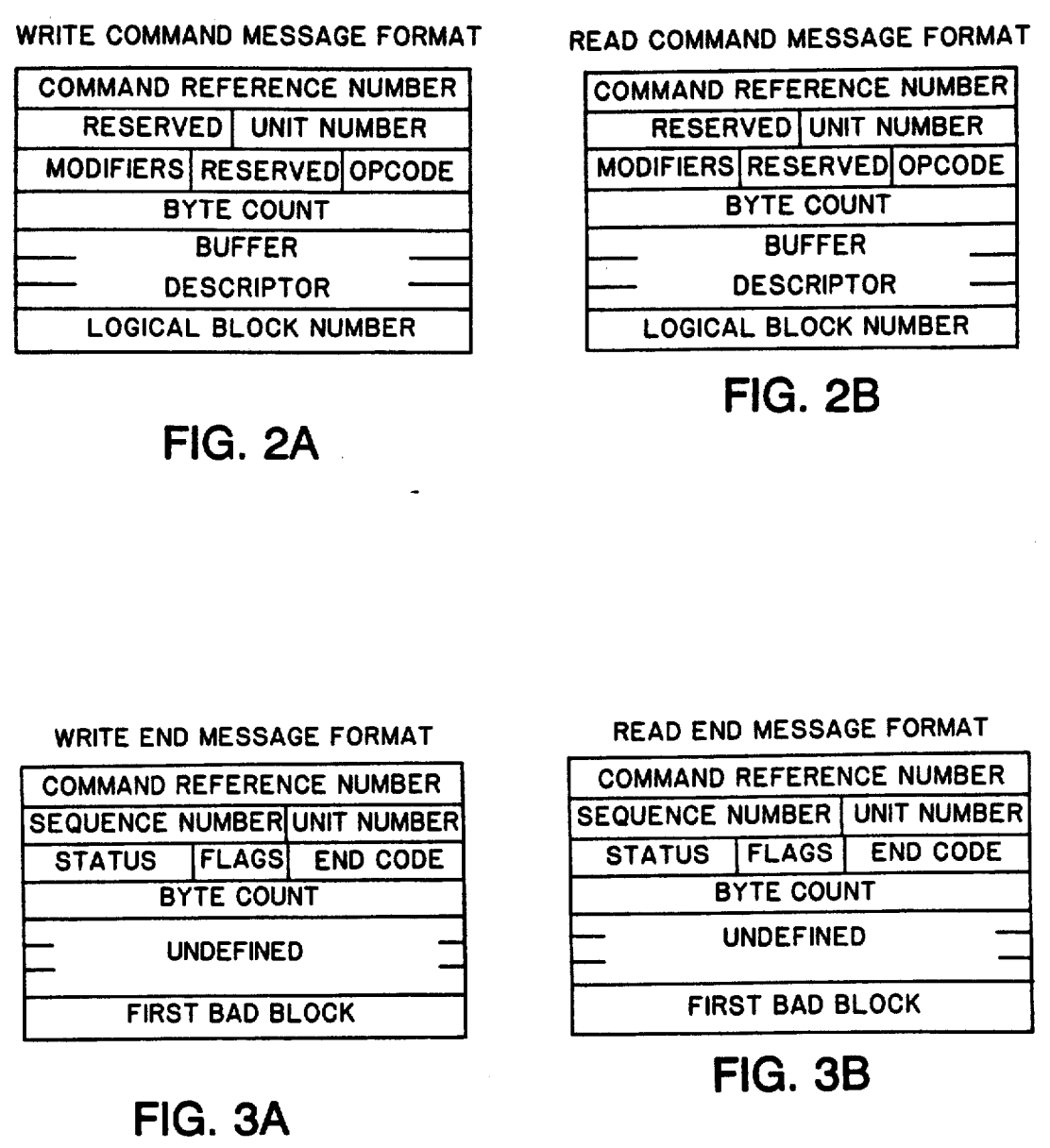

WRITE COMMAND MESSAGE FORMAT

| COMMAND REFERENCE NUMBER | | |
|---|---|---|
| RESERVED | UNIT NUMBER | |
| MODIFIERS | RESERVED | OPCODE |
| BYTE COUNT | | |
| BUFFER DESCRIPTOR | | |
| LOGICAL BLOCK NUMBER | | |

FIG. 2A

READ COMMAND MESSAGE FORMAT

| COMMAND REFERENCE NUMBER | | |
|---|---|---|
| RESERVED | UNIT NUMBER | |
| MODIFIERS | RESERVED | OPCODE |
| BYTE COUNT | | |
| BUFFER DESCRIPTOR | | |
| LOGICAL BLOCK NUMBER | | |

FIG. 2B

WRITE END MESSAGE FORMAT

| COMMAND REFERENCE NUMBER | | |
|---|---|---|
| SEQUENCE NUMBER | UNIT NUMBER | |
| STATUS | FLAGS | END CODE |
| BYTE COUNT | | |
| UNDEFINED | | |
| FIRST BAD BLOCK | | |

FIG. 3A

READ END MESSAGE FORMAT

| COMMAND REFERENCE NUMBER | | |
|---|---|---|
| SEQUENCE NUMBER | UNIT NUMBER | |
| STATUS | FLAGS | END CODE |
| BYTE COUNT | | |
| UNDEFINED | | |
| FIRST BAD BLOCK | | |

FIG. 3B

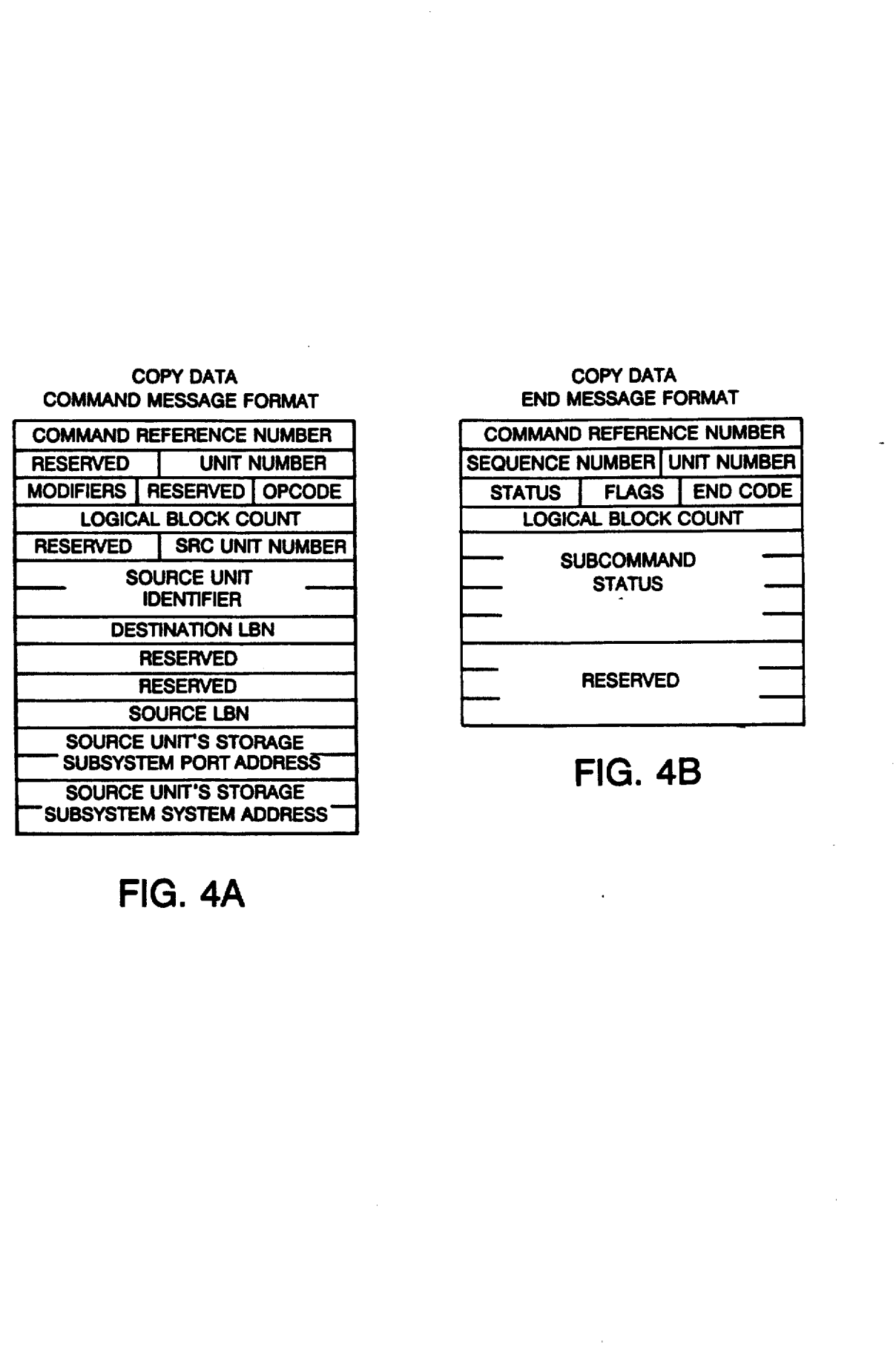

COPY DATA
COMMAND MESSAGE FORMAT

| COMMAND REFERENCE NUMBER | | |
|---|---|---|
| RESERVED | UNIT NUMBER | |
| MODIFIERS | RESERVED | OPCODE |
| LOGICAL BLOCK COUNT | | |
| RESERVED | SRC UNIT NUMBER | |
| SOURCE UNIT IDENTIFIER | | |
| DESTINATION LBN | | |
| RESERVED | | |
| RESERVED | | |
| SOURCE LBN | | |
| SOURCE UNIT'S STORAGE SUBSYSTEM PORT ADDRESS | | |
| SOURCE UNIT'S STORAGE SUBSYSTEM SYSTEM ADDRESS | | |

FIG. 4A

COPY DATA
END MESSAGE FORMAT

| COMMAND REFERENCE NUMBER | | |
|---|---|---|
| SEQUENCE NUMBER | UNIT NUMBER | |
| STATUS | FLAGS | END CODE |
| LOGICAL BLOCK COUNT | | |
| SUBCOMMAND STATUS | | |
| RESERVED | | |

FIG. 4B

TRANSFERRING DATA IN A DIGITAL DATA PROCESSING SYSTEM

This is a continuation of application Ser. No. 07/374,253, filed Jun. 30, 1989, now abandoned.

RELATED APPLICATIONS

This application is related to the following pending applications, all of which are filed concurrently herewith, and each of which is incorporated herein by reference: U.S. patent application Ser. No. 07/374,490, in the name of Scott H. Davis, William L. Goleman and David W. Thiel, and entitled Digital Data Management System; U.S. patent application Ser. No. 07/374,528, in the name of Scott H. Davis, William L. Goleman and David W. Thiel, and entitled Transferring Data In A Digital Data Processing System; and U.S. patent application Ser. No. 07/374,251, in the name of Scott H. Davis, William L. Goleman, David W. Thiel, Robert G. Bean and James A Zahrobsky, and entitled Data Storage Device for a Digital Data Processing System.

BACKGROUND OF THE INVENTION

This invention relates to a system for transmitting data between two storage devices associated with a digital data processing system. The preferred embodiment is described in connection with a system for establishing and maintaining one or more duplicate or "shadow" copies of stored data to thereby improve the availability of the stored data.

A typical digital computer system includes one or more mass storage subsystems for storing data (which may include program instructions) to be processed. In typical mass storage subsystems, the data is actually stored on disks. Disks are divided into a plurality of tracks, at selected radial distances from the center, and sectors, defining particular angular regions across each track, with each track and set of one or more sectors comprising a block, in which data is stored.

Since stored data may be unintentionally corrupted or destroyed, systems have been developed that create multiple copies of stored data, usually on separate storage devices, so that if the data on one of the devices or disks is damaged, it can be recovered from one or more of the remaining copies. Such multiple copies are known as the shadow set. In a shadow set, typically data that is stored in particular blocks on one member of the shadow set is the same as data stored in corresponding blocks on the other members of the shadow set. It is usually desirable to permit multiple host processors to simultaneously access (i.e., in parallel) the shadow set for read and write type requests ("I/O" requests).

A new storage device or "new member" is occasionally added to the shadow set. For example, it may be desirable to increase the number of shadow set members to improve the data availability or it may be necessary to replace a shadow set member that is or has been damaged. Because all shadow set members contain the same data, when adding a new member, all of the data stored on the active members must be copied to the new member.

SUMMARY OF THE INVENTION

The invention generally features a method and apparatus for transferring data between two storage media, and is used in an illustrative embodiment to transfer data between two storage media in a shadow set, the storage media being accessible to one or more host processors. The method of the preferred embodiment includes the steps of: A. receiving a command from one of the host processors, the command specifying data to be transferred from a first storage medium to a second storage medium; B. transferring the data specified in the command received from the host from the first storage medium to the second storage medium in a series of subtransfers, each of the subtransfers transferring a portion of the data; and C. processing one or more I/O requests to the shadow set received from one or more host processors by, for each received I/O request: a. implementing the I/O request if the I/O request does not involve a section of the shadow set currently involved in one of the subtransfers; and b. stalling the I/O request if the I/O request involves a section of said shadow set currently involved in one of the subtransfers, and implementing the I/O request when the subtransfer has completed.

In the preferred embodiment, a subtransfer that has not yet begun is stalled if it involves a section of the shadow set which is currently involved in an I/O request, the subtransfer being implemented when the I/O request has completed. Each of the hosts will transmit I/O requests to the shadow set first to the storage medium from which the data in the subtransfers is obtained (i.e., the "source"), and then to the storage medium to which the subtransfer is directed (i.e., the "target"), after the I/O request to the source has completed. The command received from the host processor is received by a processor that supports the target. The processor that supports the target transmits commands to a processor that supports the source, the commands controlling the subtransfers of data from the source to the target.

The invention allows data to be transferred between two storage media, such as storage media in a shadow set of storage media in an efficient manner that does not significantly interfere with I/O requests.

Other advantages and features of the invention will be apparent from the following detailed description of the invention and the appended claims.

DESCRIPTION OF THE PREFERRED EMBODIMENTS

Drawings

We first briefly describe the drawings.

FIGS. 2A, 2B, 3A, 3B, 4A and 4B illustrate data structures employed by the invention.

STRUCTURE AND OPERATION

Figure 1:
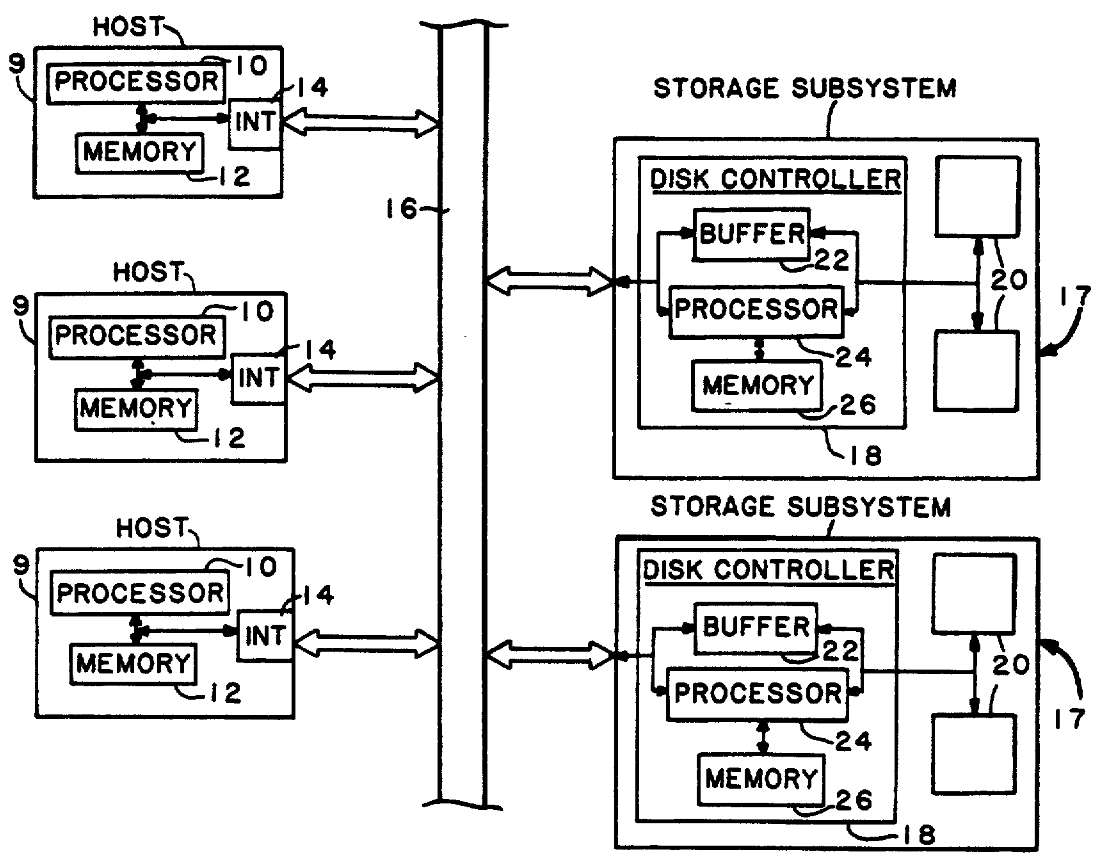
FIG. 1 is a shadow set storage system according to the present invention.

Referring to FIG. 1, a system in accordance with the invention includes a plurality of hosts 9, each of which includes a processor 10, memory 12 (including buffer storage) and a communications interface 14. The hosts 9 are each directly connected through interface 14 and a communications medium 16 (e.g., by a virtual circuit) to two or more storage subsystems, illustrated generally at 17 (two are shown in FIG. 1).

Each storage subsystem includes a disk controller 18, that controls I/O requests to one or more disks 20, two of which are shown in each subsystem. Disk controller 18 includes a buffer 22, a processor 24 and memory 26 (e.g., volatile memory). Processor 24 receives I/O requests from hosts 9 and controls I/O requests to each of its disks 20. Buffer 22 temporarily stores data received in connection with a write command before the data is written to a disk 20. Buffer 22 also stores data read from a disk 20 before the data is transmitted to the host in response to a read command.

Each host 9 will store, in its memory 12, a table that includes information about the system that the hosts 9 need to perform many operations. For example, hosts 9 will perform read and write operations to storage subsystems 17 and must know which storage subsystems are available for use, what disks are stored in the subsystems, etc. As will be described in greater detail below, the hosts 9 will slightly alter the procedure for read and write operations if data is being transferred from one shadow set member to another. Therefore, the table will store status information regarding any ongoing operations. The table also contains other standard information.

While each storage subsystem may include multiple disks 20, the members of the shadow set are chosen to include disks in different storage subsystems 17. Therefore, a host may directly access each member of the shadow set, through its interface 14 and over communication medium 16, without requiring it to access two shadow set members through the same disk controller 18. This will avoid a "central point of failure" in the event of a failure of one of the disk controllers 18. In other words, if members of a shadow set have a common disk controller 18, and if that controller 18 malfunctions, the hosts will not be able to successfully perform any read and write operations. In the preferred system, the shadow set members are "distributed", so that the failure of one device (e.g., one disk controller 18) will not inhibit read and write operations because they can be performed using another shadow set member accessed through another disk controller.

When data is written to the shadow set by a host, the host issues a command whose format is illustrated in FIG. 2A. The command includes a "command reference number" field that uniquely identifies the command, and a "unit number" field that identifies the unit (e.g. the disk 20) to which data is to be written to or read from within each shadow set disk. The "opcode" field identifies to the disk controller that the operation is a write operation. The "byte count" field specifies the total number of bytes of data to be written and the "logical block number" field identifies the starting location on the disk. The "buffer descriptor" identifies a section of host memory 12 that contains the data to be written. The "modifier" field is used to identify options associated with specific commands.

The format of a read command is illustrated in FIG. 2B, and includes fields that are similar to the write command fields. For a read command, the buffer descriptor contains the location in host memory 12 to which the data read from the disk is to be stored.

Once a host transmits a read or write command, it is received by the disk controller 18 that supports the disk identified in the "unit number" field. For a write command, the disk controller will implement the write to its disk 20 and return an "end message" to the originating host, the format of the write command end message being illustrated in FIG. 3A. The end message includes a status field that informs the host whether or not the command completed successfully. If the write failed the status field can include error information, depending on the nature of the failure.

For a read command, the disk controller will read the requested data from its disk and transmit the data to memory 12 of the originating host. After the data has been transferred, an end message is generated by the disk controller and sent to the originating host, the format of the read command end message being illustrated in FIG. 3B. The read command end message is similar to the end message for the write command.

One of the system's host processors will control operations for adding a new disk to the shadow set. The system can select any host processor to execute the operation. For example, the host processor with the best transmission path (e.g., the fastest path) to the shadow set may be chosen.

The host controlling the addition of the new disk to the shadow set will select a currently active disk 20 to serve as a "source," with all of the data on the source being copied to the new disk or "target." A connection, such as a virtual circuit, is established between the storage subsystems that support the source and the target disks, and the data is transferred directly from the source storage subsystem to the target subsystem.

To begin the data transfer, a host sends a command to the disk controller supporting the target disk specifying the identity of the source and the address of the data to be transferred. The target disk then establishes a connection with the disk controller supporting the source and instructs the source's disk controller to transmit the data from the source.

A host implements the direct transfer using a "Copy Data" command. This command permits quantities of data to be copied from one disk device to another without host intervention. A disk controller may support two different types of copy operations; local and remote. A local copy operation involves the transfer of data between two disks that are both physically connected to the storage subsystem in which the disk controller that received the command is located (i.e., both disks are supported by the same disk controller). A remote copy operation involves the transfer of data between disks in different storage subsystems. Both storage subsystems in a remote copy operation must be connected to the same communications medium, i.e., they must be able to communicate with each other. As noted above, it is preferable to have the disks of the shadow set in different storage subsystems, so remote copy operations are used in the preferred system.

We will first describe the commands used to perform the direct copy operation and will then explain how a direct copy operation is implemented using the commands.

As noted above, to begin the operation, a host sends a "Copy Data" command to the disk controller that supports the target disk. The command message format for this command is illustrated in FIG. 4A.

The "unit number" field identifies the target unit—i.e., the specific disk 20 to which data is to be copied. The "logical block count" field identifies the total number of logical blocks to be copied from the source disk to the target disk.

The "src unit number" field identifies the source unit—i.e., the disk from which data is to be copied. The "source lbn" field identifies the logical block number (position) on the source disk's volume at which the copy operation is to start. If this value does not actually reflect a block on the source disk, the disk controller rejects the command as an invalid command.

The "destination lbn" field identifies the logical block number (position) on the destination or target disk's volume at which the copy operation is to start. If this value does not actually represent a block on the target disk, the disk controller rejects the command as an invalid command.

The "source unit identifier" field specifies a unique identifier assigned to the source disk that is obtained from the source disk by the host before the host issues any cop data commands. The target disk controller compares the value of this field against the "unit identifier" it obtains directly from the source disk. If the values do not match exactly, the controller rejects the command as an invalid command.

The "source unit's storage subsystem port address" identifies the communication protocol port address of the storage subsystem to which the source disk is physically connected. The information encoded in this field is the port address formatted as required by the particular communications protocol being used. The target disk controller ignores this field if either of the following conditions exist:

1. The target disk controller does not provide remote copy support—i.e., only local copy is supported; or 2. The target disk controller supports remote copy operations but the "Local Source Unit" modifier (explained below) is set. (I.e., the field is ignored as unnecessary if the source disk is local.)

For a remote disk copy operation, the target disk controller rejects the command as an invalid command if the content of the source disk's storage subsystem port address field:

1. Is not formatted correctly for the communications protocol being used; or

2. Identifies the subsystem in which the target disk is located. (I.e., a remote copy operation cannot identify a local disk as the source.)

The "source unit's storage subsystem system address" is the communications protocol system address of the storage subsystem to which the source disk is physically connected. The information encoded in this field is the system address value formatted as required by the communication protocol being used. Like the port address field described above, the target disk controller ignores this field if either the target disk controller does not provide remote copy support, or if the Local Source Unit modifier is set. If the content of this field is not formatted correctly for the communications protocol being used, the controller rejects the command as invalid.

There are a number of possible modifiers that may be specified in the "modifiers" field. An "establish communications path" modifier, if set, will instruct the target disk controller to establish a communication path to the source disk through the source disk controller.

The target disk controller rejects the Copy Data command as an invalid command if either of the following conditions exist:

1. The "establish communications paths" modifier is clear and the required communications paths have not been established.

2. The "establish communications paths" modifier is set and communications paths previously established on behalf of the issuing host are still intact.

For a disk controller that supports remote copy, the setting of a "Local Source Unit" modifier indicates that the source disk is a disk connected to the same disk controller as the target disk. Hosts clear this modifier to indicate that the source disk is located in another storage subsystem. This modifier is ignored by controllers that only support local copy operations.

The setting of the "Retain Communications Paths" modifier determines whether the disk controller should retain the communications paths after the copy operation has been aborted, completed, or terminated. If this modifier is set, the communications paths are retained. A host may therefore issue subsequent Copy Data commands without incurring the overhead associated with establishing the communications paths. If this modifier is clear, the target controller performs the operations necessary to disconnect the communications paths upon completion of the request.

The end message format for the Copy Data command is illustrated in FIG. 4(*b*). The end message is returned to the host that issued the Copy Data command by the target disk controller after the Copy Data command is executed.

There are several possible flags that may be used in the "flags" field of the Copy Data end message including a "Communications Paths Retained" flag. The setting of this flag indicates whether the communications paths have been retained. If this end flag is set, the communications paths have been retained. If this flag is clear, the communications paths have been disconnected.

The "logical block count" field gives the number of logical blocks successfully copied from the source disk to the target disk. If an unrecoverable error occurs, the target controller sets this value equal to the number of logical blocks beginning with the "destination lbn" that were successfully copied to the target disk prior to the occurrence of the unrecoverable error. If no unrecoverable errors occur during the copy operation, the disk controller sets this value equal to the exact "logical block count" that was specified in the command message.

The "subcommand status" field contains information related to the failure of a subcommand issued by the disk controller to the source disk or the target disk. The contents of this field are undefined unless this command was terminated due to an error. If the command was terminated due to an error, the "Destination" (i.e., target) or "Source" bit flag (contained in the status field) identifies which device encountered the condition or error. In cases where multiple conditions or errors have occurred, either on one or both devices, the controller only records and reports the first condition or error detected, all others being discarded.

The purpose of the "subcommand status" field is to provide hosts with information to aid in recovering from failures that occur during the copy operation.

Figure 5:
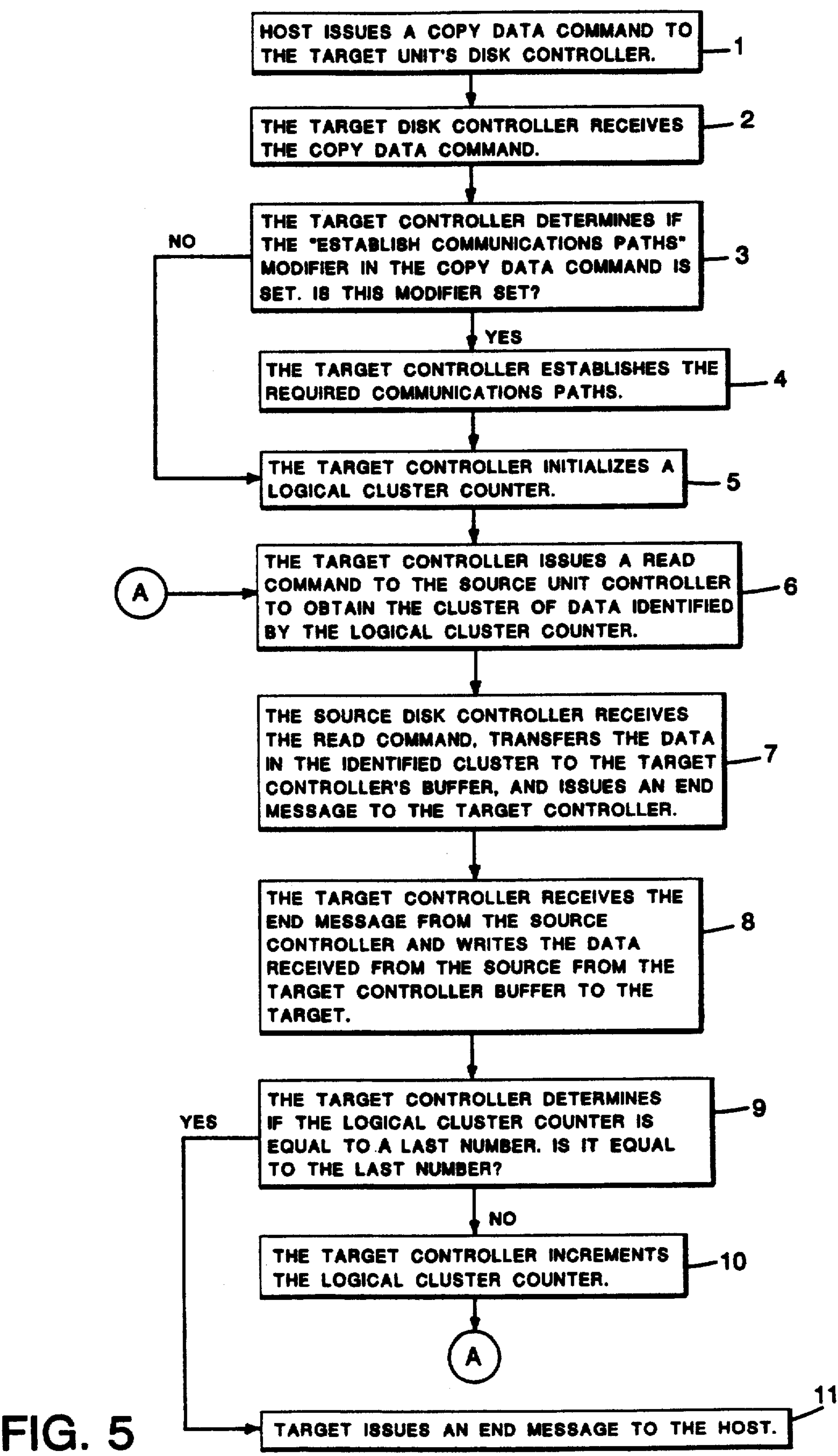
FIG. 5 is a flow chart illustrating a preferred embodiment of a method of copying data according to the invention.

Now that the commands and data structures used in performing the copy operation have been described, the method of copying data from a source to a target will be explained, with reference to the flowchart of FIG. 5. The host controlling the copy operation first issues a Copy Data command to the target disk controller, specifying the disks that are to act as the source and target, the starting logical block numbers on the source and target, and the quantity of data to be copied from the source to the target (step 1). The target disk controller receives the command (step 2), and determines if the Establish Communications Paths modifier is set (step 3). If the Establish Communication Paths modifier is set, the target disk controller proceeds to establish the required paths (step 4). If the source disk is located in the same storage subsystem as the target, the target controller uses internal connections to both the source and target disks. If the source disk is located in a remote subsystem, the target controller performs the communications protocol dependent operations necessary to establish a connection with the source disk's disk controller.

The target disk controller then initializes a logical cluster counter that identifies clusters of data in the source, beginning with the first clustor to be transferred (step 5). As explained below, the logical cluster counter is incremented to identify consecutive clusters to be transferred to the target and a last logical cluster number identifies the last cluster to be transferred.

The target controller next issues a Read command (see FIG. 2B) to the source disk to obtain a cluster of data identified by the logical cluster counter from the source (step 6).

Once the data is obtained from the source, the target controller issues a Write command to the target disk to copy the source data.

Steps 6–10 are repeated until the copy operation is aborted, completed, or terminated.

The target disk controller is described above as issuing read and write commands to the source and target disks of the type shown in FIG. 2. It should be noted that the disk controller is expressly permitted to perform any equivalent internal operation for the target disk and a local source disk to reduce processing overhead. Standard commands must be used in all transactions dealing with a remote source disk and its disk controller. However, if an internal operation is substituted for standard commands, the following rules are followed:

A. The result of the internal operation shall be identical to that of the standard command.

B. If the internal operation results in an error, the end message error fields are set as if a standard command had been issued.

The disk controller shall execute the Copy Data command in a manner that guarantees that logical blocks are copied to the proper place in the target disk, beginning with the logical block number specified in the "destination lbn" field of the Copy Data command message.

In order to permit write operations to the shadow set continue during the execution of a Copy Data command, some operations are performed by the target disk controller as "sequential operations" while others are performed as "non-sequential." A sequential operation to a disk is one that must be performed without any other operations being performed simultaneously. When a sequential command is received, the disk controller will complete all outstanding operations to the disk, and will inhibit new operations. When all outstanding operations have executed, the sequential operation is carried out to its completion. Once the sequential operation is completed, other operations may resume. Non-sequential commands may occur in parallel, and may be reordered to increase efficiency.

The target disk controller executes most commands relating to a Copy Data command as non sequential commands—i.e., in relation to all other commands addressed to the target disk, the subcommands the target disk controller issues to the target disk as part of the Copy Data Command may be reordered to optimize performance, and may be interleaved with other non sequential commands.

The only exception to the non-sequential execution just described is that access to the disk controller's "immediate target" on the target disk is controlled. The disk controller's immediate target is the range of logical blocks on the target disk that the disk controller is about to act upon or is currently acting upon. To be more specific the "immediate target" is the range of logical blocks specified in:

A. a Read subcommand used to obtain a cluster of source data, or

B. a Write subcommand used to copy the resultant data to the target disk.

Access to the disk controller's "immediate target" on the target disk is controlled according to the following rules:

a. If a command (such as a write) that specifies a range of logical blocks that is within or overlaps the disk controller's "immediate target" is currently in progress, the disk controller postpones issuing any subcommands that affect the "immediate target" until the command in progress completes, terminates, or is aborted.

b. If a command that specifies a range of logical blocks that is within or overlaps the disk controller's "immediate target" is received while the disk controller action on the "immediate target" is postponed (as described in "a" above), the disk controller postpones the execution of the command received until the subcommands that affect the "immediate target" have been initiated and have then completed or terminated.

c. If a command that specifies a range of logical blocks that is within or overlaps the disk controller's "immediate target" is received while the subcommands that affect the "immediate target" are currently in progress, the disk controller postpones the execution of the command (i.e., stalls the command) until the subcommands that affect the "immediate target" have been completed or terminated.

The effect of these rules is to treat access to the disk controller's "immediate target" as sequential operations. In order to postpone I/O operations as discussed above, the disk controller will store the I/O requests in a queue in an available memory, such as buffer 22. When the subtransfer for that section of the shadow set is complete, the controller accesses the queue and implements the I/O requests.

As described above, the purpose for providing the "immediate target" access behavior described above is to allow hosts to perform write operations on the target disk in a manner that guarantees that while a Copy Data command is in progress all data written to logical blocks on the target disk will be identical to those contained on the source disk. To fulfill that guarantee, hosts shall ensure that write operations addressed to the source disk that specify a range of logical blocks that is within or overlaps the range of logical blocks specified in a Copy Data command are issued and completed before the equivalent operation is issued to the target disk. This is required since, if a host issues write commands to both the target and source in parallel, the write to the target could execute before the write to the source. If this occurred and the system then performed a subtransfer to the same location on the target disk, while stalling the write to the source disk, obsolete data would be transferred from the source to the target (i.e., the data on the source is obsolete because the write to the source has not yet executed. This potential corruption of data is avoided by requiring the hosts to first complete writes to the source before issuing writes to the target.

As explained above, each host stores a table that lists data that the host needs to operate properly in the system. For example, each table will include information regarding the disks that make up the shadow set, etc. The table also stores status information that informs the host whether or not a new member is being added to the shadow set. Therefore, before a host executes an I/O request to the shadow set it will check the status field in its table, and if the host determines that a new member is being added, the host will implement the special procedures discussed above for avoiding possible data corruption. The table is kept current by requiring hosts that begin the process of adding a new member, to send a message to every other host in the system informing each host of the operation. A host that is controlling the addition of the new member will not begin the data transfer to the new member until it receives a confirmation from each host that each host has updated its table to reflect the new status of the system. Similarly, a host controlling the addition of a new member will send a message to each host when the new member has been added, and has data that is consistent with the shadow set. Upon receiving this message, hosts will resume the normal practice of issuing I/O requests in parallel.

Note that the result of a read operation issued to the target disk that specifies a range of logical blocks that is within or overlaps the range of logical blocks specified in a Copy Data command is unpredictable because data may not yet have been copied to the section of the target specified in the read command. Hosts should therefore rely solely on the contents of the source disk (or another active shadow set member) for read operations.

We claim:

1. A method of transferring data between two storage media in a shadow set of storage media accessible by one or more hose processors for I/O requests, said method comprising the steps of:

A. receiving a command from one of said host processors, said command specifying data to be transferred from a first said storage medium to a second said storage medium;

B. transferring said data specified in said command from said first storage medium to said second storage medium in a series of subtransfers, each of said subtransfers transferring a portion of said specified data; and C. processing one or more I/O requests received from said host processors for access to said shadow set by, for each received I/O request:

a. implementing said I/O request if said I/O request does not involve a section of said shadow set currently involved in one of said subtransfers; and b. stalling said I/O request if said I/O request involves a section of said shadow set currently involved in one of said subtransfers, and implementing said I/O request when said one of said subtransfers has completed.

2. The method of claim 1 further comprising stalling a said subtransfer that has not yet begun if said subtransfer involves a section of said shadow set which is currently involved in one of said I/O requests, and implementing said subtransfer when said one of said I/O requests has completed.

3. The method of claim 1 further comprising causing each of said hosts to transmit each said I/O request first to said first storage medium and, after said I/O request to said first storage medium has completed, then to said second storage medium.

4. The method of claim 1 further comprising receiving said command from said one of said host processors by a processor that manages access to said second storage medium.

5. The method of claim 4 further comprising causing said processor that manages access to said second storage medium to transmit commands to a processor that manages access to said first storage medium, said commands controlling said subtransfers.

6. The method of claim 5 wherein said commands sent from said processor that manages access to said second storage medium to said processor that manages access to said first storage medium specify an address in said first storage medium of said data to be transferred.

7. The method of claim 1 wherein each of said storage media is accessible by a plurality of host processors.

8. The method of claim 7 further comprising allowing said plurality of host processors to simultaneously access one or more of said storage media.

9. The method of claim 1 further comprising causing each of said host processors to maintain a table including information relating to said data transfer.

10. The method of claim 1 wherein each of said storage media is supported by a processor that manages access thereto, and further comprising controlling said subtransfers with said processors.

11. The method of claim 10 wherein each of said storage media is supported by a different processor.

12. The method of claim 1 wherein said storage media are disk storage devices.

13. A method of transferring data from a first storage device to a second storage device, said first storage device and said second storage device respectively comprising first and second storage media and first and second processors and being accessible to one or more host processors for I/O operations to said storage media, said method comprising the steps of:

(a) transmitting a first command from a said host processor to said first processor, said command specifying data to be transferred from one of said storage media to another one of said storage media;

(b) issuing a second command from said first processor to said second processor;

(c) transmitting said data from said one of said storage media to another one of said storage media in accordance with said second command; and (d) controlling said transmitting of said data with said first and second processors.

14. A method of transferring data between two storage media in a shadow set of storage media accessible by one or more host processors for I/O requests, said method comprising the steps of:

A. receiving a command from one of said host processors, said command specifying data to be transferred from a first said storage medium to a second said storage medium;

B. transferring said data from said first storage medium to said second storage medium in response to said command; and C. when said transferring is occurring, causing each of said host processors to transmit each said I/O request first to said first storage medium and, after said I/O request to said first storage medium has completed, then to said second storage medium, and thereafter allowing said host processors to transmit each said I/O request to said first storage medium and said second storage medium in any order.

15. An apparatus for transferring data between two storage media in a shadow set of storage media accessible by one or more host processors for I/O requests, said apparatus comprising:

a processor that manages access to a first said storage medium and operative to receive a command from one of said host processors, said command specifying data to be transferred between said first storage medium and a second said storage medium;

means responsive to said processor that manages access to said first storage medium for transferring said data specified in said command between said first storage medium and said second storage medium in a series of substransfers, each of said subtransfers transferring a portion of said specified data; and means for processing one or more I/O requests received from said host processors for access to said shadow set by, for each received I/O request:

a. implementing said I/O request if said I/O request does not involve a section of said shadow set currently involved in one of said subtransfers being performed by said means for transferring; and b. stalling said I/O request if said I/O request involves a section of said shadow set currently involved in one of said subtransfers, and implementing said I/O request when said one of said subtransfers has completed.

16. The apparatus of claim 15 wherein said means for transferring transfers said data from said second storage medium to said first storage medium.

17. The apparatus of claim 15 further comprising a processor that manages access to said second storage medium, and operative to receive commands from said processor that manages access to said first storage medium.

18. The apparatus of claim 17 wherein said processor supporting said second storage medium is operative to control said subtransfers in response to said commands.

19. The apparatus of claim 17 wherein said commands received by said processor supporting said second storage medium from said processor supporting said first storage medium specify an address in said second storage medium of said data to be transferred.

20. The apparatus of claim 15 wherein said means for transferring stalls a said subtransfer that has not yet begun if said subtransfer involves a section of said shadow set which is currently involved in one of said I/O requests, said means for transferring implementing said subtransfer when said one of said I/O requests has completed.

21. The apparatus of claim 15 wherein each of said host processors includes means for sending each said I/O request first to said second storage medium and, after said I/O request to said second storage medium has completed then to said first storage medium.

22. The apparatus of claim 15 wherein each of said storage media is accessible by a plurality of said host processors.

23. The apparatus of claim 22 wherein said plurality of host processors can simultaneously access one or more of said storage media.

24. The apparatus of claim 15 wherein each of said host processors maintains a table including information relating to said data transfer.

25. The apparatus of claim 15 wherein said storage media are disk storage devices.

26. An apparatus for transferring data between a first storage medium and a second storage medium, said storage media being accessible by one or more host processors for I/O operations to said storage media, said apparatus comprising:

a first processor that manages access to said first storage medium and operative to receive a command from one of said host processors, said command specifying data to be transferred between said storage media;

a second processor that manages access to said second storage medium and operative to receive a second command from said first processor; and means controlled by said first processor and said second processor for transferring said specified data between said first storage medium and said second storage medium in accordance with said second command.

27. The apparatus of claim 26 wherein said storage media comprises a shadow set of storage media and said data is transferred between said storage media in a series of subtransfers, each of said subtransfers transferring a portion of said data, said apparatus further comprising:

means for processing one or more I/O requests received from said host processors for access to said storage media by, for each received I/O request:

a. implementing said I/O request if said I/O request does not involve a section of said shadow set currently involved in one of said subtransfers; and b. stalling said I/O request if said I/O request involves a section of said shadow set currently involved in one of said subtransfers, and implementing said I/O request when said one of said subtransfers has completed.

28. The apparatus of claim 26 wherein said means for transferring transfers said data from said second storage medium to said first storage medium.

29. The apparatus of claim 28 wherein each of said hosts includes means for sending each said I/O request first to said second storage medium and, after said I/O request to said second storage medium has completed, then to said first storage medium.

30. The apparatus of claim 26 wherein each of said storage media is accessible by a plurality of said host processors.

31. The apparatus of claim 30 wherein said plurality of host processors can simultaneously access one or more of said storage media.

32. The apparatus of claim 26 wherein each of said host processors maintains a table including information relating to said data transfer.

33. The apparatus of claim 26 wherein said commands received by said second processor from said first processor specify an address in said second storage medium of said data to be transferred.

34. An apparatus for transmitting data stored in a storage medium, said storage medium being accessible by one or more host processors for I/O requests, said apparatus comprising:

a processor that manages access to said storage medium and operative to receive a command specifying data to be transmitted from said storage medium;

means responsive to said processor that manages access to said storage medium for transmitting said data specified in said command in a series of transmissions, each of said transmissions transmitting a portion of said specified data; and means for processing one or more I/O requests received from said host processors for access to said storage medium by, for each received I/O request:

a. implementing said I/O request if said I/O request does not involve a section of said storage medium currently involved in one of said transmissions being performed by said means for transmitting; and b. stalling said I/O request if said I/O request involves a section of said storage medium currently involved in one of said transmissions, and implementing said I/O request when said one of said transmissions has completed.

35. The apparatus of claim 34 wherein said means for transmitting transmits said data for receipt by a second storage medium.

36. The apparatus of claim 34 wherein said means for processing stalls a said transmission that has not yet begun if said transmission involves a section of said storage medium which is currently involved in one of said I/O requests, said means for processing implementing said transmission when said one of I/O requests has completed.

37. The apparatus of claim 34 wherein said storage medium is accessible by a plurality of said host processors.

38. The apparatus of claim 34 wherein said processor that manages access to said storage medium receives said command from one of said host processors.

39. The apparatus of claim 34 wherein said processor that manages access to said storage medium receives said command from a controller that supports a second storage medium.

40. The apparatus of claim 34 wherein said storage medium is one member in a shadow set of storage media, said means for transmitting sending said specified data to another member of said shadow set.

* * * * *